(12) United States Patent
Cheeseman

(10) Patent No.: US 9,920,685 B2
(45) Date of Patent: Mar. 20, 2018

(54) MESH ANCHORED COMBUSTION INTERNAL COMBUSTION ENGINE

(71) Applicant: Peter Charles Cheeseman, Berkeley, CA (US)

(72) Inventor: Peter Charles Cheeseman, Berkeley, CA (US)

( * ) Notice: Subject to any disclaimer, the term of this patent is extended or adjusted under 35 U.S.C. 154(b) by 308 days.

(21) Appl. No.: 14/806,574

(22) Filed: Jul. 22, 2015

(65) Prior Publication Data

US 2017/0022883 A1    Jan. 26, 2017

(51) Int. Cl.
| | |
|---|---|
| *F02B 19/12* | (2006.01) |
| *F02B 19/06* | (2006.01) |
| *F02B 75/04* | (2006.01) |
| *F02P 15/00* | (2006.01) |
| *F02P 23/02* | (2006.01) |
| *F02P 23/04* | (2006.01) |

(Continued)

(52) U.S. Cl.
CPC ............. *F02B 19/12* (2013.01); *F02B 9/06* (2013.01); *F02B 19/06* (2013.01); *F02B 53/12* (2013.01); *F02B 75/042* (2013.01); *F02P 15/00* (2013.01); *F02P 23/02* (2013.01); *F02P 23/04* (2013.01); *Y02T 10/125* (2013.01); *Y02T 10/17* (2013.01)

(58) Field of Classification Search
CPC .......... F02B 19/02; F02B 19/04; F02B 19/06; F02B 19/12; F02P 19/02; F02F 1/186; F02F 2001/249; F02M 29/04
See application file for complete search history.

(56) References Cited

U.S. PATENT DOCUMENTS

| | | | |
|---|---|---|---|
| 125,166 A | | 4/1872 | Brayton |
| 3,446,192 A | * | 5/1969 | Woodward ............. F02B 19/06 123/47 R |

(Continued)

FOREIGN PATENT DOCUMENTS

| | | | |
|---|---|---|---|
| JP | 2008297988 A | * | 12/2008 |
| JP | 2014020277 A | * | 2/2014 |

OTHER PUBLICATIONS

Information on the Davy lamp and the Meker-Fisher burner are well-understood and readily available on the internet. We recommend the Wikipedia pages for both: https://en.wikipedia.org/wiki/Davy_lamp and https://en.wikipedia.org/wiki/Meker%E2%80%93Fisher_burner.

*Primary Examiner* — Erick Solis
*Assistant Examiner* — Anthony L Bacon

(57) ABSTRACT

An engine with mesh anchored combustion with a pressure regulating auxiliary chamber for providing controlled internal combustion at essentially a constant pressure. The engine comprises a main cylinder and piston with an auxiliary chamber and piston integral therewith. The auxiliary chamber is adjacent to the main cylinder head, connected thereto through a relatively narrow throat. A mesh is positioned in the throat at the boundary of the main cylinder and the auxiliary chamber. Accordingly, when the main piston compresses a charge in the main cylinder during its compression stroke, the charge is pushed through the mesh into the auxiliary chamber. The auxiliary chamber piston pushes the charge in the reverse direction back through the mesh into the main cylinder. As the charge passes through the mesh back into the main chamber, its combustion forces the main piston back down toward bottom dead center.

20 Claims, 12 Drawing Sheets

(51) Int. Cl.
*F02B 9/06* (2006.01)
*F02B 53/12* (2006.01)

(56) References Cited

U.S. PATENT DOCUMENTS

| | | | | |
|---|---|---|---|---|
| 4,332,219 | A * | 6/1982 | Gonzalez | F02B 43/10 123/1 A |
| 4,352,655 | A * | 10/1982 | Tucker | F02B 19/02 123/188.4 |
| 4,854,279 | A * | 8/1989 | Seno | F01C 1/3446 123/204 |
| 5,465,702 | A * | 11/1995 | Ferrenberg | F02B 75/02 123/543 |
| 5,632,255 | A * | 5/1997 | Ferrenberg | F02B 41/04 123/543 |
| 7,469,662 | B2 * | 12/2008 | Thomas | F02B 19/12 123/258 |
| 2006/0219210 | A1 * | 10/2006 | Bailey | F02B 19/06 123/259 |
| 2013/0220269 | A1 * | 8/2013 | Woo | F02B 19/06 123/260 |
| 2014/0331960 | A1 * | 11/2014 | Lee | F02B 19/06 123/275 |

* cited by examiner

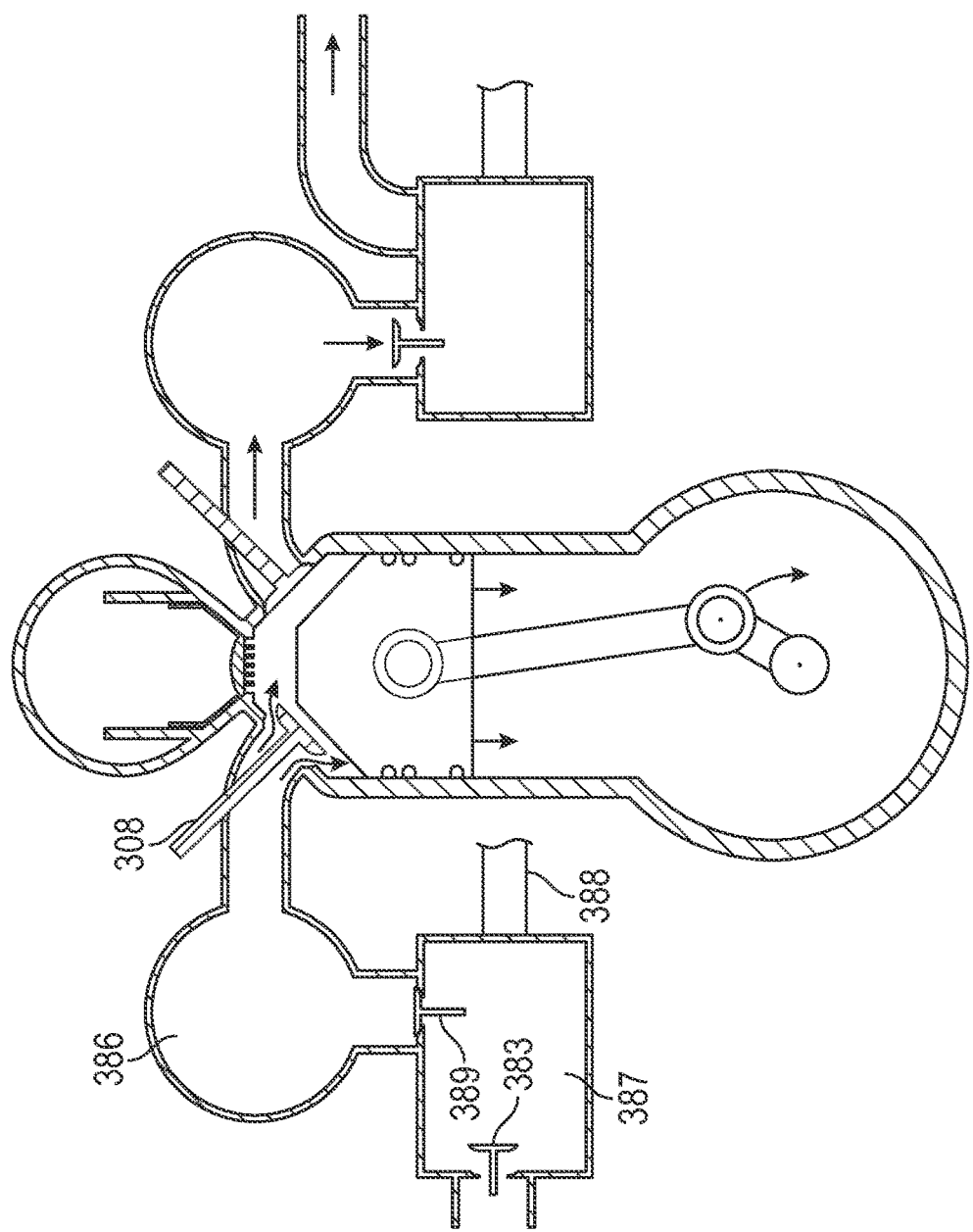

MESH ANCHORED COMBUSTION INTERNAL COMBUSTION ENGINE

SUMMARY OF THE INVENTION

A mesh anchored combustion internal combustion engine for providing improved efficiency by enabling the use of high, diesel like compression ratios and lean burn, while avoiding the emissions problems associated with compression ignition combustion ("CI") methods. The mesh anchored combustion internal combustion engine includes an auxiliary chamber attached to the head of a main engine chamber with a mesh disposed in a throat area defined by where the main engine chamber and the auxiliary chamber meet. The engine piston compresses a charge (i.e. a fuel-air mixture) in the main engine chamber and pushes all the charge through the mesh into the auxiliary chamber; the first pass of the charge through the mesh. A free piston in the auxiliary chamber then pushes the charge in the reverse direction back into the main engine chamber in coordination with the engine piston; the second pass of the charge through the mesh. As the charge passes back through the mesh, it is ignited and combusts as it emerges into the main engine chamber, with the combustion/flame anchored to the main engine chamber side of mesh.

Advantageously, the addition of the auxiliary chamber with a free piston to the main engine chamber along with the positioning of the mesh in the throat between the chambers improves engine efficiency for several reasons. For example, the mesh anchored combustion internal combustion engine provides a flame front (along the surface of the main engine chamber side of mesh) that enables a near constant pressure combustion, allowing higher compression ratios as well as leaner fuel-air ratios to be used without creating a "knocking" effect. In addition, the mesh is designed to absorb minimal heat and its placement limits turbulence to a localized area around the mesh, thereby increasing efficiency due to lower heat loss. Furthermore, the design of the mesh anchored combustion internal combustion engine enables it to employ a variety of known charge input and exhaust configurations and charge ignition methods.

These and other advantages and objects will be apparent to one of skill in the art.

BRIEF DESCRIPTION OF THE DRAWINGS

FIG. 8B is a cross-section view in elevation of a mesh anchored combustion engine built in accordance with a supercharged embodiment of the present invention.

DETAILED DESCRIPTION OF THE INVENTION

Figure 1:
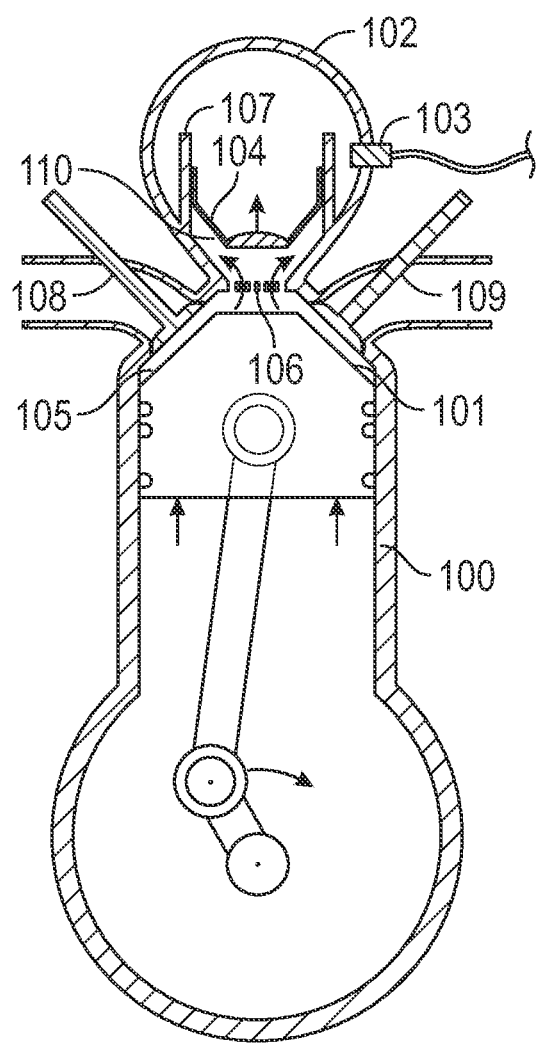
FIG. 1 is a cross-section view in elevation of a mesh anchored combustion engine built in accordance with a four stroke embodiment of the present invention.

Referring now to the drawings and in particular FIGS. 1, 2A, 2B, 2C, 2D, 2E, 2F, 2G, and 2H, a four stroke engine embodiment of a mesh anchored combustion engine with pressure regulating auxiliary chamber is shown as a modified single cylinder piston/crank engine assembly similar to that found in conventional piston engines. In addition to the standard components found in standard piston engines, such as a main cylinder 100, piston 101, crankshaft, connecting rod, intake valve 108, and exhaust valve 109, the modified piston engine assembly includes a pressure chamber 102 that includes a an auxiliary piston cylinder 107. The pressure chamber 102 is connected to the head of the main cylinder 100 such that the main cylinder chamber 105 and auxiliary cylinder chamber 110 are connected through a relatively narrow throat. A mesh 106 is disposed at the boundary of the main chamber 105 and the auxiliary chamber 110.

The auxiliary piston cylinder 107 includes an auxiliary piston 104 slidably disposed therein. In the preferred embodiment, the auxiliary piston 104 defines a free piston. It is contemplated that the auxiliary piston 104 (or "free-piston") is sized and oriented in the auxiliary piston cylinder 107 such that its edges form a seal with the surface of the auxiliary piston cylinder 107 in a similar manner as conventional pistons and cylinders.

The pressure chamber 102 includes a pressure regulating valve 103 attached thereto that senses the pressure in the pressure chamber 102 and adds or removes gas (usually air) to maintain the pressure in the pressure chamber 102 at a level determined by the engine controller. The gas pressure sensor associated with the pressure regulating valve 103 should only sense the pressure when the auxiliary piston 104 is seated (the reference pressure). The source of the high pressure makeup gas is not shown. This pressure regulating valve 103 is only to correct for any gas leakage, and so only very small gas quantities need be added or removed by the pressure regulating valve 103 to maintain the pressure at a reference pressure. It is contemplated that the reference pressure defines a pressure level that will cause the auxiliary free-piston to remain seated during a substantial portion of the compression stroke of the main piston 101.

It is contemplated that another difference between the modified piston engine assembly and conventional piston engines is that the main piston 101 of the modified piston engine assembly is designed so that at top dead center ("TDC"), the clearance between the piston 101 and the main cylinder 100 head is as small as practically possible. In some embodiments, there may be no clearance. A narrow clearance, however, is preferred to prevent a head crash as well as to prevent relatively cold charge in the main cylinder 100 thermal boundary layer from being pushed into the auxiliary chamber 110. The main piston 101 crown is constructed so that it mirrors the shape of the main cylinder 100 head, including valves, thus ensuring that the clearance volume at TDC is minimal. This minimal clearance volume has the advantage that there are essentially no residual gases left in the main cylinder chamber 105 at the end of the exhaust stroke, so that there is no pre-heating of the intake charge from mixing between the fresh charge with the residual gases. This lack of pre-heat for modified piston engine assembly improves the engine efficiency relative to spark ignition ("SI") engines or compression ignition engines.

Figure 2A:
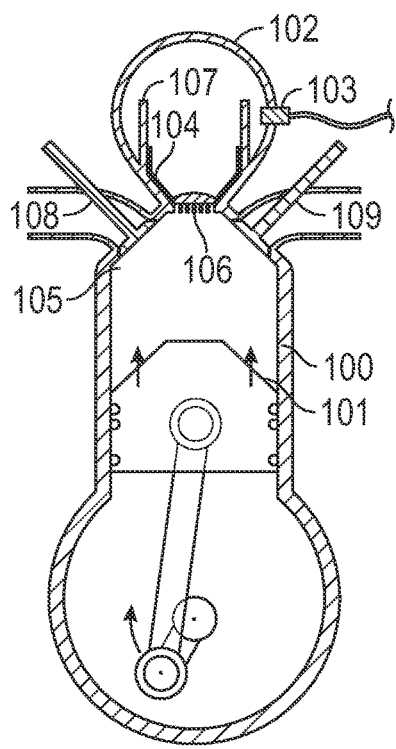
FIG. 2A is a cross-section view in elevation of a mesh anchored combustion engine built in accordance with the four stroke embodiment of the present invention at the beginning of the main piston compression stroke following the closing of the intake valve.

The four stroke operation of the modified piston engine assembly is illustrated by a sequence of particular engine configurations as shown in FIGS. 2A to 2H. FIG. 2A shows the engine just after bottom dead center ("BDC"), when the intake valve 108 has just closed, thus trapping an intake charge in the main cylinder chamber 105, as the main piston 101 is beginning its upward compression stroke. Due to the reference pressure in the pressure chamber 102, the free-piston 104 remains seated, thereby blocking the flow of any charge through the mesh 106 into the auxiliary chamber 110. Accordingly, the upward compression stroke compresses the charge in the main cylinder chamber 105, causing the pressure in the main cylinder chamber 105 to progressively increase.

Figure 2B:
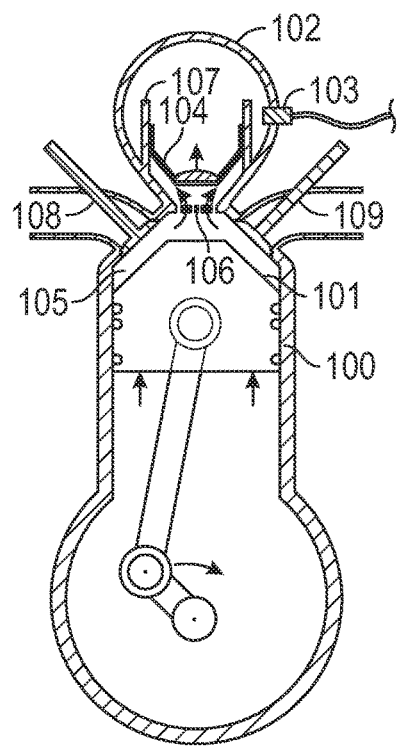
FIG. 2B is a cross-section view in elevation of a mesh anchored combustion engine built in accordance with the four stroke embodiment of the present invention during the main piston compression stroke.

FIG. 2B shows the engine just after the pressure of the charge in the main cylinder chamber 105 has risen above the pressure in the pressure chamber 102 and, as a result, the free-piston 104 is begins to move upward. In this regard, it is appreciated that the action of the free-piston 104 is thereby controlled by the pressure difference between the pressure in the main cylinder chamber 105 and that in the pressure chamber 102. With the free-piston 104 becoming unseated, the charge is then pushed through the mesh 106 into the auxiliary chamber 110.

Figure 2C:
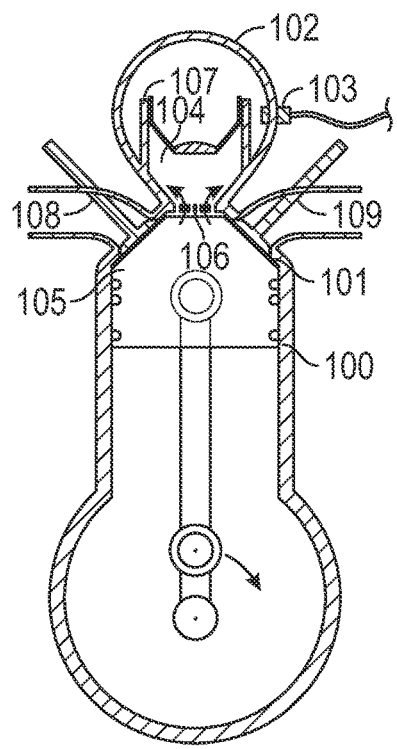
FIG. 2C is a cross-section view in elevation of a mesh anchored combustion engine built in accordance with the four stroke embodiment of the present invention with the main piston at top dead center between the compression and expansion stroke.

FIG. 2C shows the engine at TDC; at the end of the compression stroke. At this point practically all the charge that was originally trapped in the main cylinder chamber 105 by the seated free-piston 104 has been pushed through the mesh 106 into the auxiliary chamber 110. At this point, the resultant pressure of the compressed charge is essentially equal to the pressure of the gas in the pressure chamber 102.

Figure 2D:
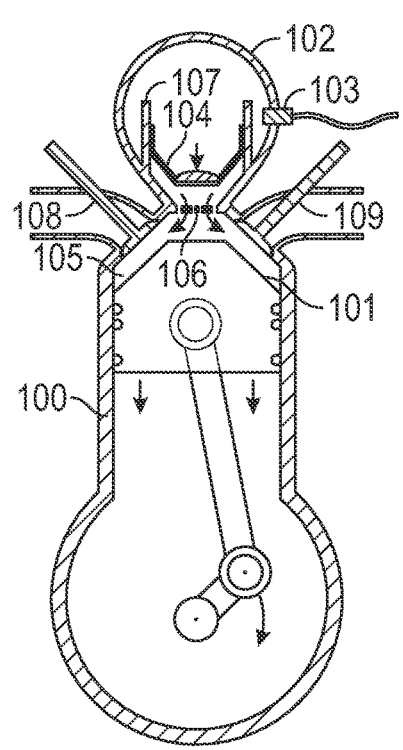
FIG. 2D is a cross-section view in elevation of a mesh anchored combustion engine built in accordance with the four stroke embodiment of the present invention at the beginning of the main piston expansion stroke.

FIG. 2D shows the engine just after TDC, with the main piston 101 moving downward on its expansion stroke. As the main piston 101 descends, the pressure difference between the pressure chamber 102 pressure and the main cylinder chamber 105 pressure causes the free-piston 104 to also descend. The combined motion of the main piston 101 and free-piston 104 moves the charge previously contained in the auxiliary chamber 110 through the mesh 106. As the charge passes through the mesh 106, it mixes with the hot, already burned gas in the main cylinder, 105, and this causes the entering charge to also burn. This gaseous mixing is caused by local turbulence created by the gas flowing through the mesh, and so combustion of the inflowing charge is anchored to the mesh. The resulting combustion in the main cylinder chamber 105 occurs at essentially constant pressure.

Figure 2E:
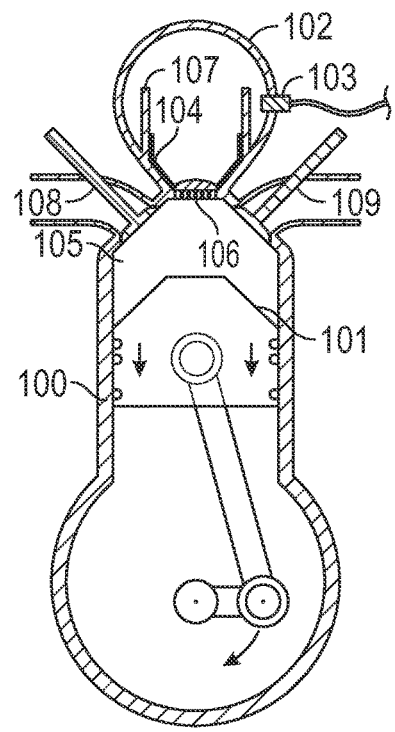
FIG. 2E is a cross-section view in elevation of a mesh anchored combustion engine built in accordance with the four stroke embodiment of the present invention during the main piston expansion stroke.

FIG. 2E shows the engine partway through its expansion stoke. At this point, all the charge that was in the auxiliary chamber 110 has now re-entered the main cylinder chamber 105 and burned as it passed through the mesh 106. The free-piston 104 is now reseated and held firmly in place by the higher pressure in the pressure chamber 102. This reseating event occurs at a larger crank-angle than the corresponding unseating event that occurred during the compression stroke. This difference in crank-angle is the result of the expansion of the charge caused by its combustion, and corresponding higher temperature.

Figure 2F:
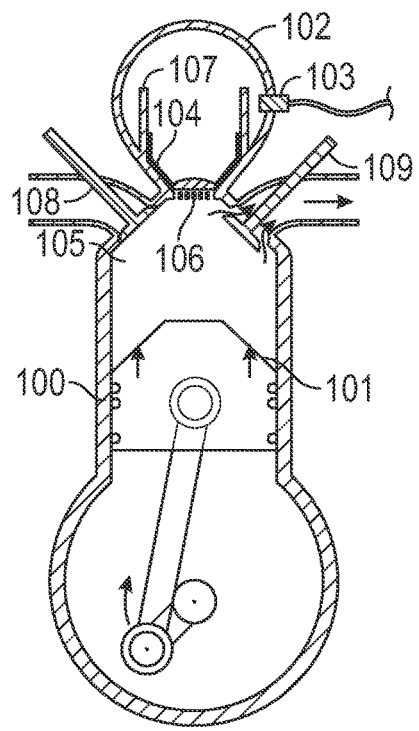
FIG. 2F is a cross-section view in elevation of a mesh anchored combustion engine built in accordance with the four stroke embodiment of the present invention at the beginning of the main piston exhaust stroke.

FIG. 2F shows the engine near the beginning of its exhaust stroke, where the exhaust valve 109 is now open and the rising main piston 101 pushes the burned gases in the main cylinder chamber 105 out past the exhaust valve 109 and into the exhaust manifold (not shown).

Figure 2G:
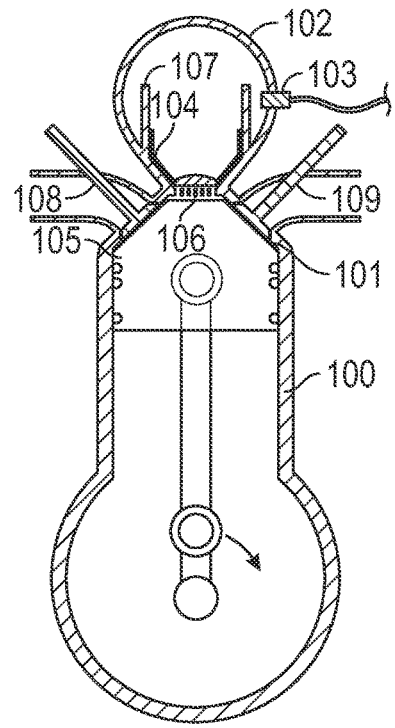
FIG. 2G is a cross-section view in elevation of a mesh anchored combustion engine built in accordance with the four stroke embodiment of the present invention with the main piston at top dead center between the exhaust and intake stroke.

FIG. 2G shows the main piston 101 at TDC, where the exhaust valve 109 is now closed and essentially all the burned gases have been pushed out of the main cylinder chamber 105. It is appreciated that the closure of the exhaust valve 109 must be coordinated with the motion of the main piston 101 so as to prevent collision between them. As previously indicated, such collision avoidance is aided by allowing a small clearance between the main piston 101 and the main cylinder 100 head.

Figure 2H:
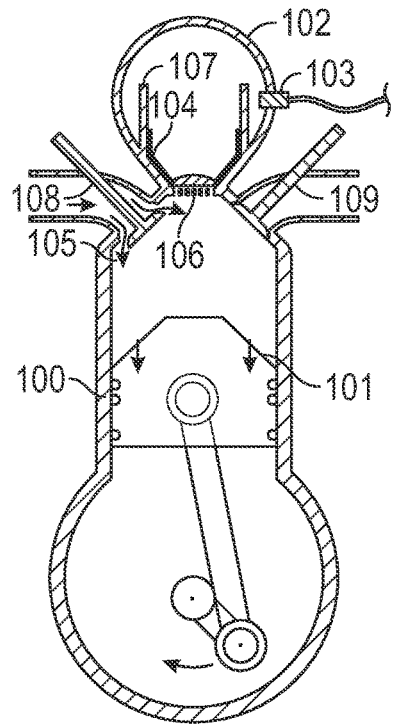
FIG. 2H is a cross-section view in elevation of a mesh anchored combustion engine built in accordance with the four stroke embodiment of the present invention with the main piston approaching bottom dead center during the intake stroke.

As the main piston begins its downward stroke, the intake valve 108 begins to open, thus beginning the intake stoke. FIG. 2H shows the main piston approaching BDC, with the intake valve 108 still open, but beginning to close. As the main piston 101, passes through BDC, the intake valve 108 closes, and the engine returns to the situation shown in FIG. 2A—i.e. the engine has completed its 4-stroke cycle.

Figure 3A:
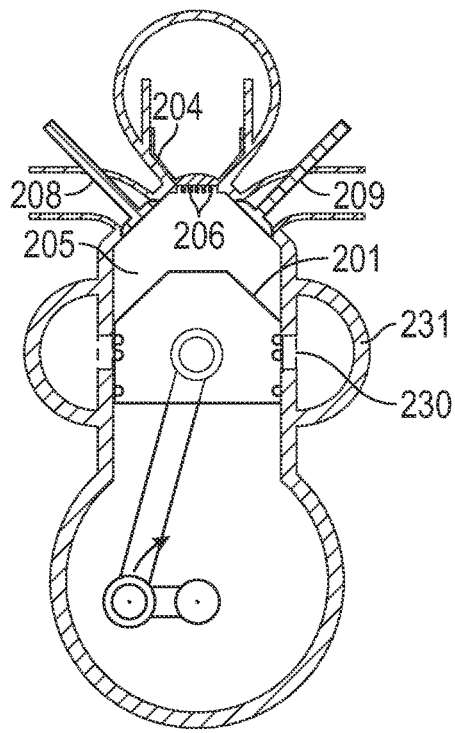
FIG. 3A is a cross-section view in elevation of a mesh anchored combustion engine built in accordance with a two stroke embodiment of the present invention with the main piston moving towards top dead center.
Figure 3B:
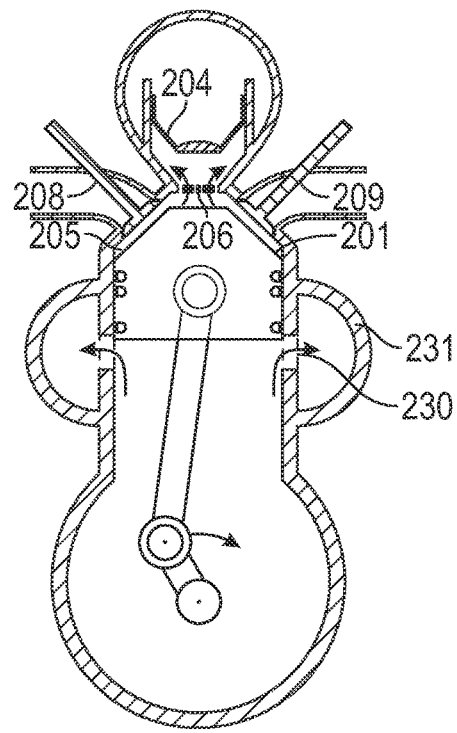
FIG. 3B is a cross-section view in elevation of a mesh anchored combustion engine built in accordance with the two stroke embodiment of the present invention with the main piston approaching top dead center.
Figure 3C:
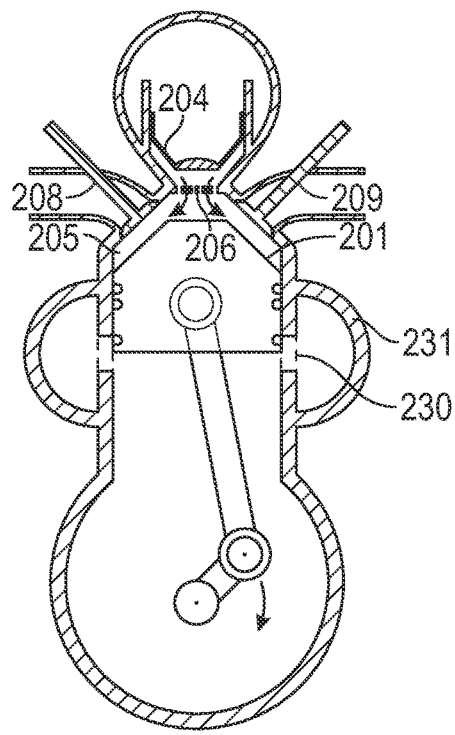
FIG. 3C is a cross-section view in elevation of a mesh anchored combustion engine built in accordance with the two stroke embodiment of the present invention with the main piston just after top dead center.
Figure 3D:
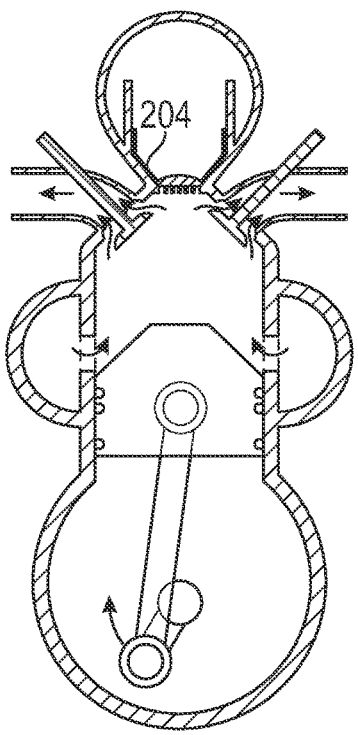
FIG. 3D is a cross-section view in elevation of a mesh anchored combustion engine built in accordance with the two stroke embodiment of the present invention with the main piston just after bottom dead center.
Figure 4:
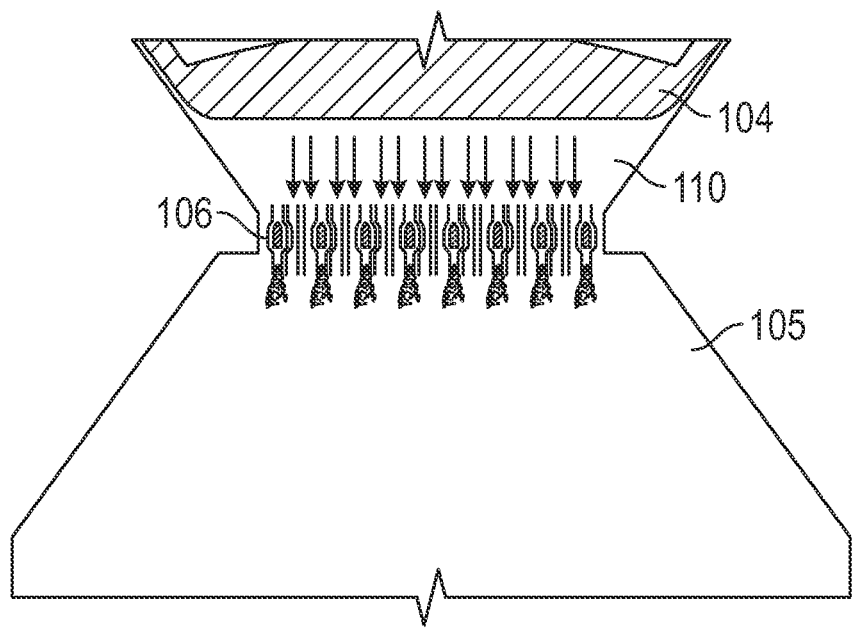
FIG. 4 is a cross-section view in elevation of the connecting throat between a main cylinder chamber and auxiliary cylinder chamber of a mesh anchored combustion engine built in accordance with the present invention.

Referring now to FIGS. 3A, 3B, 3C, and 3D, it is appreciated that the ignition/combustion method of the present invention, with four stroke operation illustrated in FIG. 2A-2H, can be adapted to two stroke operation as illustrated in FIG. 3A-3D. FIG. 3A shows the two stroke engine after BDC, when the main piston 201, beginning its upward compression stroke, has just covered up the inlet ports 230 and trapped the charge in the main cylinder chamber 205. FIG. 3B shows the engine where the main piston 201 is near TDC (i.e. near the end of its compression stroke) with most of the charge that was in the main cylinder chamber 205 now in the auxiliary chamber 210 and the auxiliary piston 204 nearing its maximum height. FIG. 3C shows the engine in essentially the same configuration as FIG. 2D above. In both 2 and 4 stroke cases, the charge flows through the mesh 206, and burns as it passes through back into the main cylinder chamber 205. This gas flow is driven by the combined motion of the auxiliary piston 204 and the main piston 201, just as in the four-stroke case. FIG. 3D shows the main piston 201 at DBC, where the inlet ports 230 are now uncovered and the exhaust valves 209 are open. Charge flows from the pressurized inlet manifold 231, through the inlet ports 230 into the main cylinder chamber 205, pushing the exhaust gases out of the main cylinder chamber 205 thought the exhaust valves 209. As the main piston starts its upward motion, it covers up the inlet ports 230 and returns the engine to the configuration shown in FIG. 3A, thus completing the 2-stroke cycle.

It is contemplated that the means for pressurizing the inlet charge for two stroke operation could be any of the standard means, such as crankcase pressurization, or a separate compressor. Furthermore, the uniflow scavenging means shown in FIG. 3 is not the only option, as other well-known scavenging means, such as loop scavenging or cross-flow scavenging could be used. Uniflow scavenging has the advantage of higher scavenging efficiency, but has the cost and complexity disadvantage of needing exhaust valves in the main cylinder head. Other, less efficient scavenging means, on the other hand, only need port valves.

It is appreciated by that the combustion method of the present invention is essentially the same for two stroke and four stroke operation. The major difference between two and four stroke operation is substantially limited to the inherent differences in the two: the gas exchange process.

Referring now to FIGS. 2A-2H and 4, the throat region of a modified piston engine assembly built in accordance with the present invention is shown at a particular point in its operation wherein the charge is flowing from the auxiliary chamber 110, to the main chamber 105 through the mesh 106. As the relatively cold charge emerges through holes (or cells) in the mesh, local turbulence causes it to mix with the hotter, already burned gases in the main cylinder, 105, causing the charge to burn in turn. The local turbulence is caused by the charge flowing past the mesh structure, and the turbulent mixing creates flamelets on the underside of the mesh anchored to each mesh cell. Once these flamelets are initiated (an ignition event), further combustion is self-sustaining, as long as fresh charge is flowing through the mesh.

This mesh anchored combustion ("MC") differs from a freely propagating turbulent flame front that occurs in SI engines in that in MC, the flame front is anchored to the mesh at all engine speeds. In MC, even though the flow rate of the charge through the mesh varies with both engine speed and crank angle, the mesh ensures that all the charge burns, and that all combustion is completed at the same crank angle (i.e. at the crank angle at which the auxiliary piston becomes seated). This complete combustion of the charge for MC regardless to engine speed and Equivalence Ratio (i.e. the fuel to air ratio relative to stoichiometric) ("ER") of the charge is in contrast with SI method of combustion, where for too lean a charge or too slow an engine speed, the freely-propagating flame may be extinguished before combustion is complete, with resulting loss of efficiency and increased emissions. This difference between MC and SI combustion implies that MC can operate with significantly lower ER than SI—i.e. an MC engine can operate efficiently over a much wider range of ER values (availing "lean burn") than an SI engine can. In particular, an MC engine can use ER values of approximately 0.6 or less; so that the resulting flame temperature is below that at which significant NOx emissions are produced (i.e. NOx production is kinetically suppressed). Suppressed NOx production means that an oxidation catalyst is all that is needed in the exhaust system (to clean up any unburned fuel). Alternatively, an MC engine can be operated with an ER=1 (stoichiometric operation) and use a 3-way catalyst for exhaust cleanup, as standard for SI engines. This lean burn range also means that engine torque and power can be varied by controlling the ER value within a range dictated by the requirement that ER values be high enough to ensure complete oxidation of the fuel (i.e. ER is approximately >0.33) but low enough that NOx production is suppressed (ER<0.6) or a 3-way exhaust catalyst is used (ER=1). CI engines use a similar ER control method to vary engine torque/power.

In addition to anchoring the flame, the mesh also acts as a back-propagation flame suppressor, so that the flame does not migrate into the auxiliary chamber 110. The ability of a mesh to suppress flame propagation across itself is the basis of the safety lamp invented by Sir Humphrey Davy in 1815, and interestingly, was also utilized in the Brayton engine—one of the earliest ICEs, and the after whom the Brayton cycle is named. The use of a mesh to burn a pre-mixed charge passing through it also has a long history. The Meker (or Meker-Fisher) burner, a successor to the Bunsen burner, was introduced in 1909 by Georges Meker and uses a mesh to initiate and anchor many flamelets. Meker burners operate continuously, unlike MC combustion, which operates cyclically, so that for MC, combustion must be re-initiated (an ignition event) at the beginning of each combustion phase. In MC, the flame is automatically extinguished when the charge stops flowing (i.e. when the auxiliary piston 104 becomes seated).

Note that even if, for some reason, a flame were to be initiated so that combustion takes place within the auxiliary chamber 110, the effect of such abnormal combustion is that the auxiliary piston 104 would rise to a greater height than normal, and there would be greater heat transfer to the auxiliary piston 104, the mesh 106 and the auxiliary piston cylinder 107. Provided that an engine according to the present invention is designed to accommodate this higher heat load, there would be no damage to the engine due to such abnormal combustion.

An advantage of MC over SI combustion is that for MC, combustion is completed at the same crank angle and Compression Ratio ("CR"), regardless of the main chamber dimensions. An SI engine by contrast has to be operated at a lower CR for larger piston bore due to a tendency for SI engines to knock with increasing bore. This knock sensitivity of SI engines means that high power engines typically have many cylinders, with corresponding increased complexity, cost, and heat loss. An MC engine, by contrast, can utilize the minimum number cylinders consistent with other considerations, such as engine balance, without loss of efficiency.

Figure 5A:
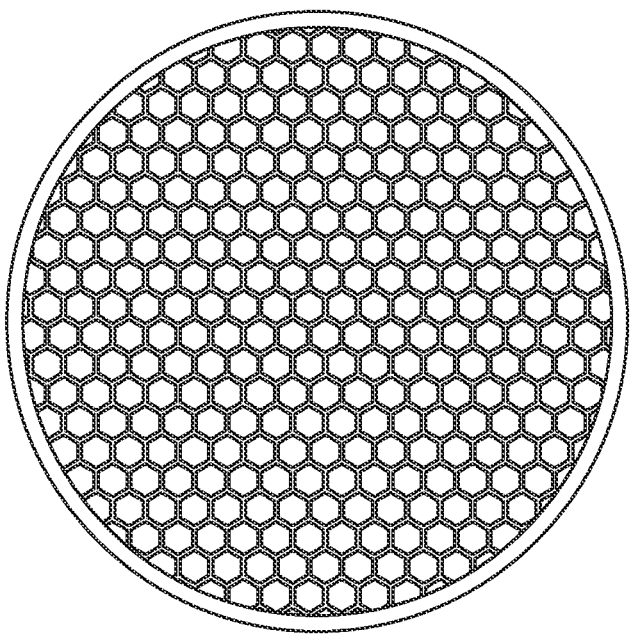
FIG. 5A is a top plan view of a mesh with hexagonal cells of a mesh anchored combustion engine built in accordance with the present invention.
Figure 5B:
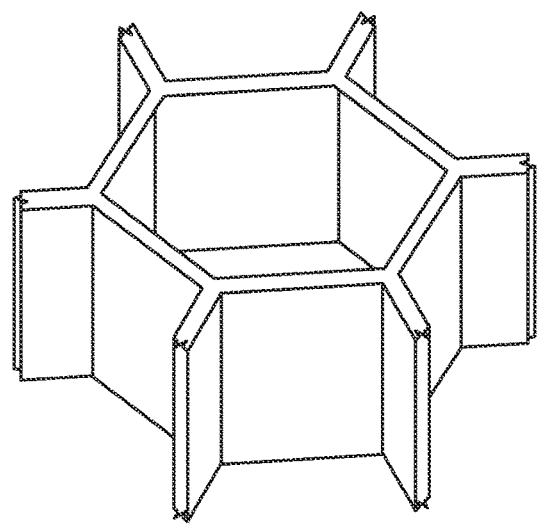
FIG. 5B is a partial perspective view of a hexagonal mesh cell of a mesh anchored combustion engine built in accordance with the present invention.
Figure 5C:
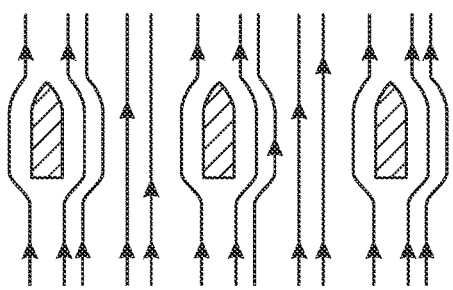
FIG. 5C is a cross-section view in elevation of a mesh of a mesh anchored combustion engine built in accordance with the present invention with charge passing in a first direction.
Figure 5D:
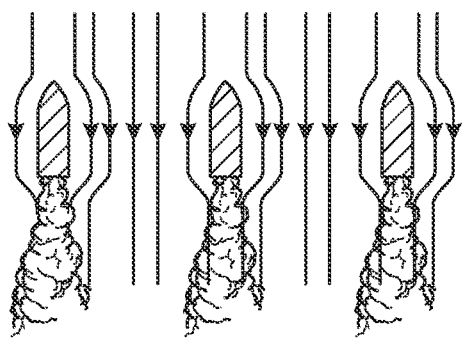
FIG. 5D is a cross-section view in elevation of a mesh of a mesh anchored combustion engine built in accordance with the present invention with charge passing in a second direction.

Referring now to FIGS. 5A, 5B, 5C, and 5D, it is appreciated that just about any mesh that allows gas to flow through it will work in the present invention. An example mesh with hexagonal geometry is shown in FIGS. 5A and 5B. Other mesh geometries, including triangular or square meshes would also be suitable. To maximize efficiency, the mesh should minimize the pressure drop ("flow resistance") created by the gas flowing through it. A way of minimizing flow resistance is to minimize the cross-sectional area of the mesh in the plane perpendicular to the flow direction. Such an area minimization is limited only by the need for the mesh to have sufficient mechanical strength. A further reduction of the flow resistance for the gas flow into the auxiliary chamber can be achieved by making the top of the mesh walls more aerodynamically shaped and the bottom of the mesh walls having a sharp edge as shown in FIGS. 5C and 5D. Through such a design, when the charge is flowing up from the main cylinder to the auxiliary cylinder, flow resistance is minimized. When the charge flow direction is reversed however, the design creates local turbulence around the lower surface of the mesh walls. This local turbulence promotes combustion by mixing the relatively cold unburned entry charge with the hotter already burned charge in the main cylinder.

In operation, the mesh will rapidly equilibrate to the temperature of the compressed gas passing through it in both directions. The resulting hot mesh will lose heat to the main cylinder head mainly by conduction. To minimize this heat loss (and so maximize efficiency) the mesh should be constructed of a material that can withstand the maximum operational temperate and preferably have low thermal conductivity, at least around the edge of the mesh where it contacts the cylinder head. Also, to minimize heat loss, the cross-sectional area of the mesh in contact with the cylinder head should be minimized, consistent with the mechanical strength requirements.

It is understood that the mesh can be constructed from many different materials that meet the needs outlined above—i.e. able to withstand the charge compression temperature (unlikely to exceed 700 C); and have low thermal conductivity. In addition, such mesh material must be non-catalytic; otherwise the mesh would prematurely ignite the charge, and become overheated (because the mesh would then be exposed to the flame temperature rather than compression temperature). Suitable materials include: stainless-steel and non-catalytic ceramics.

Figure 6A:
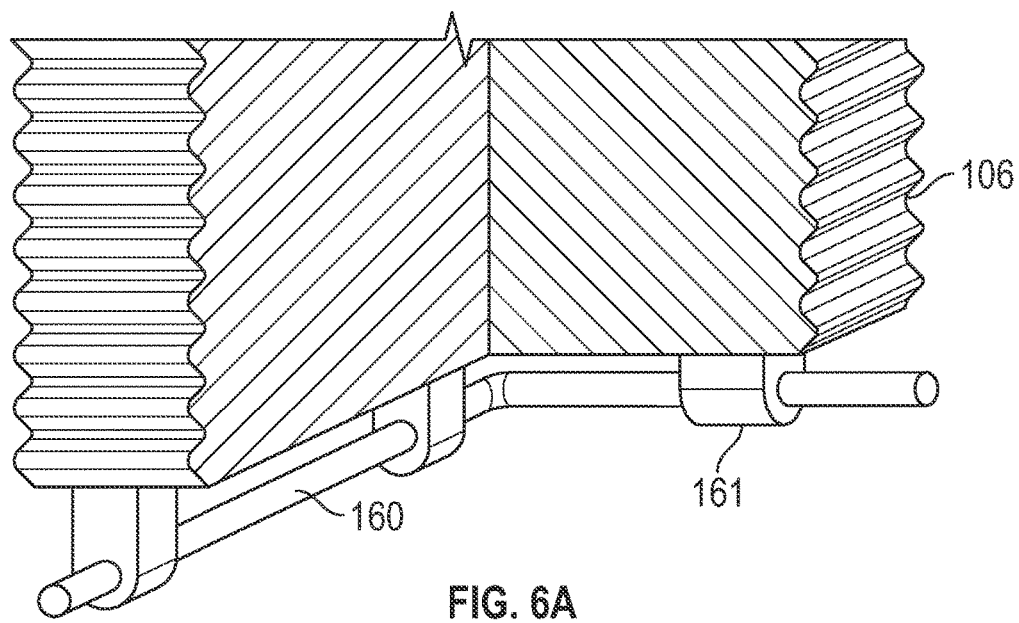
FIG. 6A is a partial perspective view of a mesh mounted electrical resistance wire ignition assembly of a mesh anchored combustion engine built in accordance with the present invention.
Figure 6B:
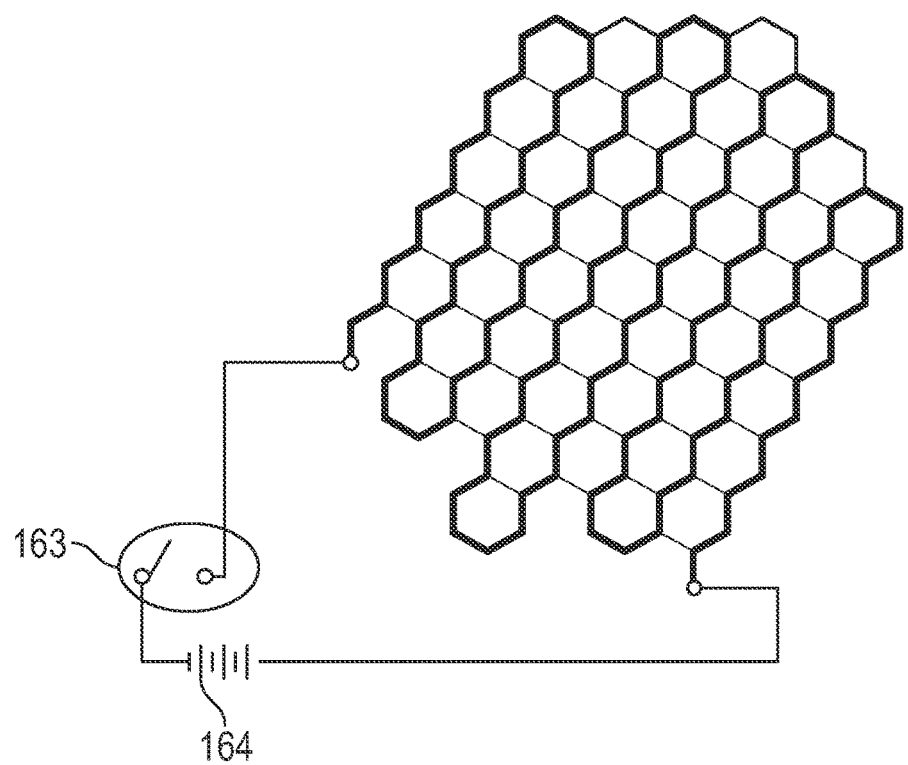
FIG. 6B is an exemplary schematic view of an electrical resistance wire ignition of a mesh anchored combustion engine built in accordance with the present invention.
Figure 6C:
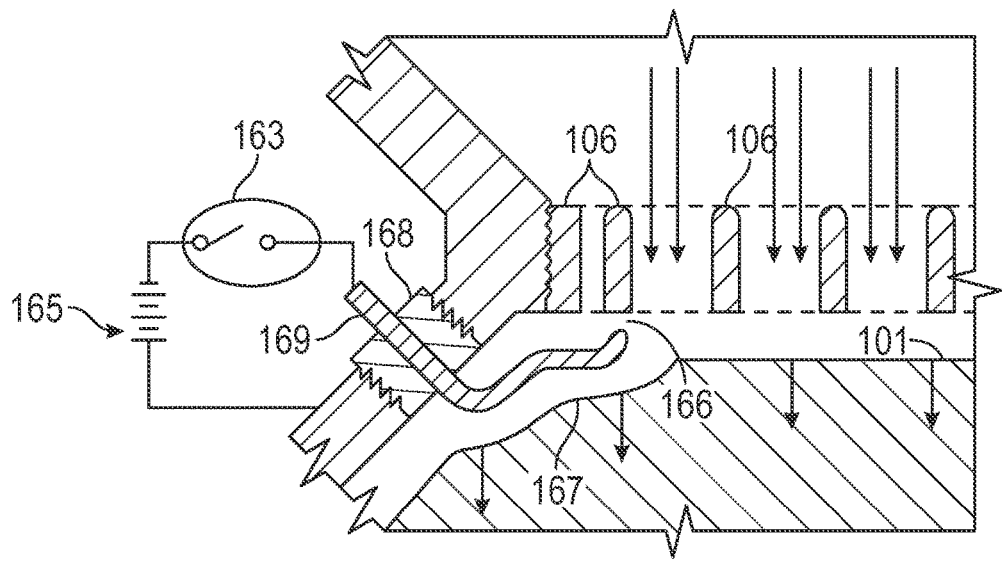
FIG. 6C is a partial elevation view of a spark ignition assembly of a mesh anchored combustion engine built in accordance with the present invention.

Referring now to FIGS. 6A, 6B, and 6C, it is an essential part of the present invention that after the charge begins to flow from the auxiliary chamber back into the main chamber (i.e. after TDC) that a means to ignite the charge be provided. After ignition has initiated a flame to start the combustion, the mesh created turbulence sustains all further combustion of the charge as it flows into the main chamber. That is, the ignition means is only activated briefly after TDC, to create the initial flame, and is not needed to maintain the flame during the rest of the time that the charge is flowing into the main chamber. Since SI engines use a similar ignition means to initiate a flame, nearly every ignition means used in ICE engines can also be used in the present invention. This includes, but not limited to: electric sparks, "glow plugs", lasers, etc., whose timing is controlled by the engine controller to occur at a preset point in the cycle, just after TDC.

In one embodiment, an ignition means may be an electrical resistance wire 160 freely suspended below the underside of the mesh 106, by electrically and thermally insulating supports, 161, as shown in FIG. 6A. Shortly after TDC, electrical power source, 164, is switched on by switch 163, causing a large current to flow through the resistance wire 160, following a snaking path such as shown in FIG. 6B. As a result of this current, the resistance wire 160 heats up to above ignition temperature, thus igniting the charge in its vicinity and initiating the combustion. This local flame will be rapidly propagated to the entire under side of the mesh, 106 primarily propagated by the turbulence created around the mesh underside by the flowing charge. Because of this lateral spread of the initial flame, the resistance wire 160 does not have to cover the entire underside of the mesh 106. Because the resistance wire 160 is suspended in the hot combustion gases through the entire combustion phase, it must be composed of a material that can withstand these temperatures. Suitable materials for the resistance wire 160, include Nichrome (or similar alloys), SiC, MoSi2, etc.

In another embodiment, an electric spark plug ignition means is employed as shown in FIG. 6C. In such an embodiment, combustion is initiated around the moment when the main piston 101 begins moving downward with a spark being initiated across the spark gap 166. The high voltage current from source 165 flows through the insulated spark wire 169 to a point on the underside of the conducting mesh 106 when switched on by switch 163. An electrically and thermally insulating plug 168 ensures that the conducting wire 169 does not short-circuit, and that it causes minimal heat flow to the cylinder walls. In order to accommodate the spark wire 169 at TDC, a groove 167 must be provided in the main piston 101. The spark created in the spark gap 166 is local to that area, but the flame it creates will rapidly propagate laterally to ignite the entire underside of the mesh 106 because of mesh-created turbulence. Although only one spark plug is shown in FIG. 6C, it is understood that more rapid flame propagation will be occur if multiple such spark plugs are located around the rim of the mesh 106.

It is appreciated that one skilled in the art will understand that FIG. 6C merely illustrates an adaption of standard spark ignition spark plug as currently used in SI engines. One minor difference is that in the present invention, the turbulence in the vicinity of the spark gap 166 is weaker than in a corresponding SI engine, so a weaker spark is sufficient.

Figure 7:
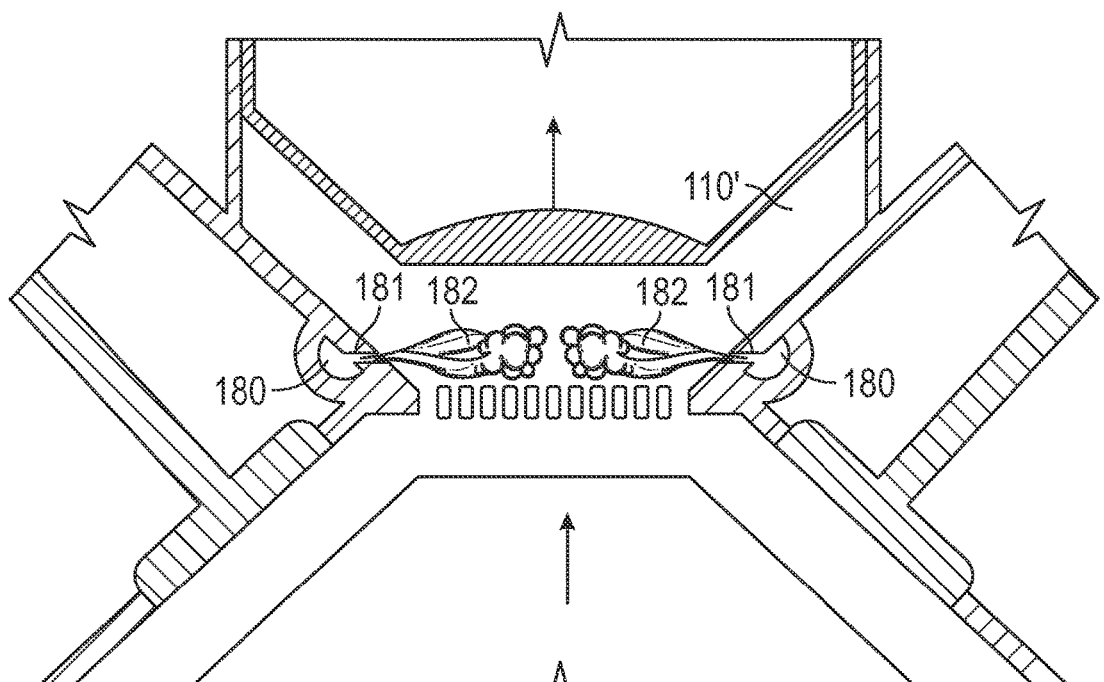
FIG. 7 is a cross-section view in elevation of the connecting throat between a main cylinder chamber and auxiliary cylinder chamber of a mesh anchored combustion engine built in accordance with an alternate, fuel injection embodiment of the present invention.

Referring now to FIG. 7, in an alternate embodiment, fuel injection is employed to introduce the fuel to the auxiliary chamber 110'. Because of its similarity to SI engines, fuel injection can be accomplished in the present invention by similar means to that used by SI engines. In particular, intake port fuel injection can be used as in SI engines, with the attendant advantages of low pressure injection and complete mixing of the vaporized fuel with the air by the time combustion begins. Intake port injection, however, has the disadvantage that some of the resulting charge is trapped in engine crevasses, particularly piston ring crevasses during the compression stroke. This trapped charge is released back into the main cylinder during the expansion stroke, and typically undergoes only partial oxidation because of the lower temperature of the expanded burned gases. This partial oxidation is believed to be a major source of pollutants, and also means a reduced efficiency. The fraction of the initial charge stored in crevasses increases with increasing CR, so raising the CR to improve thermal efficiency is partially offset by this increased crevasse loss.

To avoid this crevasse loss, an alternative late fuel injection method can be employed. In this late fuel injection method, only air is inducted into the main cylinder and compressed during the compression stroke. This means that only compressed air is stored in any engine crevasses, so its re-release during the expansion stoke does not contribute to pollution or cause a loss of efficiency. Instead, fuel 182 is injected through narrow needles 181 into the hot compressed air as it enters the auxiliary piston cylinder, causing it vaporize and mix with this inflowing air. The fuel to be injected comes from a pressurized ring 180 that feeds a set of injection needles 181 distributed around the base of the auxiliary chamber 110'. The fuel injection pressure and rate is chosen so that by the time the resulting charge flows back into the main cylinder through the mesh it is well mixed (i.e. essentially homogeneous). The main disadvantages of this late fuel injection relative to port injection are that it requires much higher injection pressure, and the mixing time is very short, particularly at high engine speeds, potentially leading to rough burning. An advantage of late fuel injection is that ignition can be achieved passively using a combustion catalyst. For example, if the resistance wire in FIG. 6 is replaced by a high temperature catalytic wire, such as platinum, this catalytic wire will automatically ignite the charge as it flows into the main cylinder chamber. Such a catalytic igniter will not work for port fuel injection, because it would ignite the charge before it enters the auxiliary piston cylinder. Late fuel injection, as shown in FIG. 7, is similar to a method used in SI engines referred to as Gasoline Direct Injection (GDI)—this high-pressure GDI fuel injection technology can be adapted to the present invention.

With respect to the embodiments of the present invention, consideration of the dynamics of the auxiliary piston during engine operation shows that the mass of this piston should be minimized. The auxiliary piston is driven by the pressure difference between the pressure in the main cylinder chamber and the pressure in the pressure chamber. Because of the inertia of the auxiliary piston, there will be a delay between the applied pressure difference and the motion of the auxiliary piston. Thus, the larger the auxiliary piston mass, the larger this inertial delay. An effect of this inertial delay is that the pressure in the main chamber will initially rise above that in the pressure chamber, with this over-pressure increasing with increasing engine speed. If this over-pressure is too high it can trigger autoignition of the charge, with consequent loss of efficiency and heating of the mesh, auxiliary piston, and the pressure chamber. Another effect of excessive over-pressure is to cause the auxiliary piston to overshoot, with subsequent oscillation. Such oscillations can trigger autoignition, and cause excessive heat loss, and so should be avoided.

In many prior art auxiliary piston designs, the auxiliary piston width is substantially the same as the throat width (a "straight" design). It is appreciated that in alternate embodiments of the present invention, this straight design is possible. In the preferred embodiment of the present invention, however, a "funnel" design for the auxiliary piston is employed. In the funnel design, the auxiliary piston is substantially wider than the throat width. The effect of this funnel design is that the total force acting on the auxiliary piston is increased relative to the straight design, by an amount given by the ratio of the auxiliary piston area to the throat area. Also, the distance the auxiliary piston has to travel is reduced by an amount given by the ratio of the throat area to the area of the auxiliary piston. This increased force and reduced travel distance of the funnel design reduces the inertial delay of the auxiliary piston relative to straight designs. In addition, the reduced travel distance of the auxiliary piston, also reduces the engine height, which can be important in some applications. Furthermore, the funnel design reduces the total surface area exposed to the hot compressed charge relative to straight designs, and so reduces heat loss.

It is further appreciated that another advantage of the funnel design over the straight design is that both the auxiliary piston mass and seating impact velocity are reduced. These reductions combine to greatly reduce the impact energy that must be dissipated when the auxiliary piston is reseated (relative to the straight design). Furthermore, the impact area of the funnel design is much larger than the straight design, so the piston impact energy is distributed over a wider area, thus creating less noise and local wear. Also, as the auxiliary piston approaches its seated position, the gas between auxiliary piston and the pressure vessel walls is squeezed out, and so forms a momentary gas "cushion" to help dissipate the auxiliary piston impact energy.

The gas in the pressure chamber effectively provided a gas spring that controls the motion of the auxiliary piston. Spring control of the auxiliary piston provides a pressure leveling effect so that maximum pressure is less than for similar CI or SI engines. One consequence of this pressure leveling is that it reduces engine mass, since any internal combustion engine must be designed to withstand the maximum pressure. This pressure leveling also produces less stress on bearings, with corresponding reduced friction and wear. Pressure leveling also has the effect of smoothing the torque on the output shaft, so that the transmission has to absorb less torque variation. Also pressure leveling reduces the rate of pressure change, thus producing less engine noise and vibration. These advantages of pressure leveling via a spring controlled auxiliary piston attached to the main chamber were noted by prior inventors, and apply to the present invention.

It is contemplated that when a spring controlled auxiliary piston is employed, an air or mechanical spring (or both) may be implemented.

An engine built in accordance with present invention as exemplified in FIGS. 1 and 2A-2H is best described thermodynamically as operating on the Diesel cycle—that is; adiabatic compression, followed by constant pressure combustion/heating, followed by adiabatic expansion back to the start volume, followed by release of the exhaust gases to the atmosphere (with corresponding drop in pressure), followed by replacement of the remaining exhaust gases with a fresh charge at atmospheric pressure and temperature, thus completing the cycle. The main difference between the Diesel cycle and the Otto cycle used in SI engines is that the Diesel cycle uses constant pressure combustion, whereas the Otto cycle uses constant volume combustion. In both these cycles, the pressure in the engine cylinder drops when the exhaust valve opens allowing the exhaust gases to flow to the atmosphere—this pressure drop represents a loss of potential work. This lost work can be at least partially recovered by expanding the exhaust gas through some kind of energy extracting expander, such as a turbine or piston.

Figure 8A:
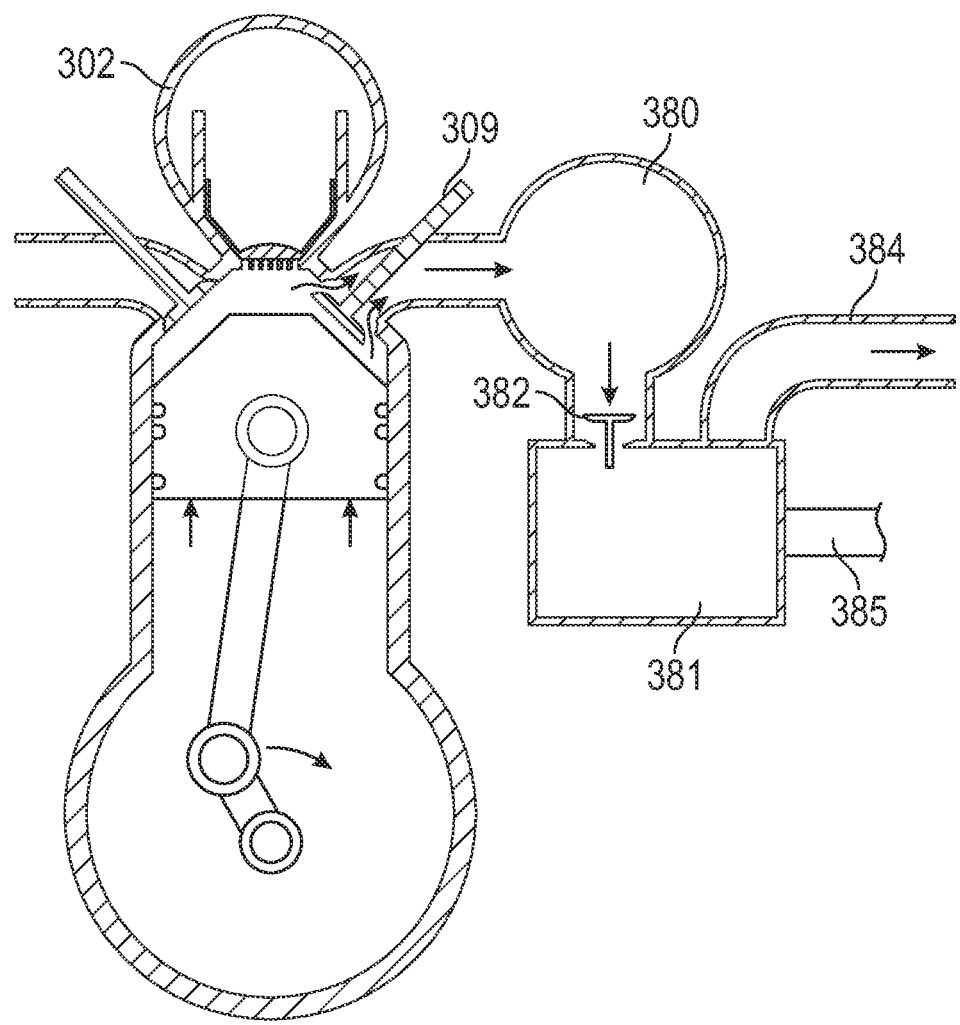
FIG. 8A is a cross-section view in elevation of a mesh anchored combustion engine built in accordance with an exhaust expander embodiment of the present invention.

Referring now to FIG. 8A, a method of recovering at least some of this work is shown as an engine of the type shown in FIG. 1 that additionally includes an exhaust gas pressure reservoir 380 connected to the engine exhaust. The pressure vessel 380 should be thermally insulated, and of sufficient volume that the pressure fluctuations from the periodic influx of exhaust gases through the exhaust valve 309, are substantially damped. The pressurized exhaust gases flow out of the pressure vessel 380, through the outflow control valve 382 into the expander 381. The expander 381 could be any device that generates mechanical energy by expanding pressurized gases down to atmospheric pressure, including a turbine, a piston expander, a scroll expander, or the like. The exhaust gases exit the expander 381 through the exhaust manifold 384. The output shaft 385 of the expander 381 could be mechanically coupled to the engine shaft or drive a separate power device such as a generator, fan, pump, compressor or the like. In an expander system of the type shown, it is necessary for the engine controller to operate the outflow control valve 382 to keep the pressure in the pressure vessel close to the engine exhaust pressure. That is, if the engine controller senses that the pressure in the pressure vessel 380 exceeds the engine exhaust pressure, it operates the outflow control valve 382 to increase the flow, and vice versa if the pressure in the pressure vessel 380 is too low.

Note that the pressure vessel 380 could contain a catalyst to clean up the exhaust before it is expanded. Locating the exhaust cleanup catalyst in the pressure vessel 380 has the advantage that the exhaust gas is at a higher temperature than after expansion through expander 381 and that the residence time of the exhaust gases is relatively long, thus increasing catalyst efficiency.

Like SI and CI engines, the MC engine of the present invention can also be supercharged. That is, the charge entering through the intake manifold can be pre-compressed by a separate compressor, thus increasing quantity of charge entering the engine, and thus increasing its power output. For SI and CI engines the CR of the engine is fixed by the geometry, so supercharging the intake raises the overall CR. This means that these engines must be designed to have a reduced CR such that when supercharged, the overall CR does not exceed the knock limit (SI engines) or maximum pressure limit (CI engines). This means that when not supercharged, such engines are operating with a CR below that for maximum efficiency. In the present invention, this compromise between power (supercharged) and efficiency (unsupercharged) does not occur. This is because the effective CR of the present invention is set by the pressure in the pressure chamber 302 so that the overall CR is the same, regardless of the amount of supercharging. Put another way, in a supercharged version of the present invention, the initial air (at atmospheric pressure) is pressurized in two stages—firstly by the supercharging compressor, and then by engine compression stroke up to the pressure of the pressure chamber 302 with the initial to final pressure ratio (or equivalently the CR) being the same, regardless of the pressure ratios of the two stages. This fixed overall CR for supercharged versions of engines of the present invention means that here there is no compromise between power and efficiency; and that controlling the level of supercharging (i.e. the pressure ratio of the compressor) gives a method of controlling the engine power output. Also, this effective fixed overall CR allows much higher level of supercharging than is normal in SI or CI engines, and allows each stage to be optimized for its respective pressure range.

Note that if an engine of the present invention is supercharged, the exhaust gas pressure is correspondingly higher. This means that for supercharged engines of the present invention, an exhaust pressure energy recovery system, such as shown schematically in FIG. 8A, will increase overall efficiency more than for unsupercharged versions.

Referring now to FIG. 8B, such a combined supercharged engine with exhaust energy recovery is shown having a thermally insulated pressure reservoir 386 attached to the engine intake manifold, where intake valve 308 intermittently admits a compressed charge into the engine from the reservoir 386. A compressor 387 compresses air admitted by compressor intake valve 383 into the pressure reservoir 386 via a pressure-operated check valve 389. This check valve 389 only allows one-way flow of gas from the compressor 387 into the pressure reservoir 386 when the pressure generated by the compressor 387 exceeds that in the reservoir 386. The amount of air admitted into the compressor is controlled by intake valve 383 (as determined by the engine controller), thus determining the level of supercharging. When the intake valve 383 reduces the air intake into the compressor by early (or late) closing, the pressure in the pressure reservoir 386 will automatically drop until it reaches an equilibrium where the amount of incoming air from the compressor matches the outgoing air passing through engine intake valve 308. The compressor 387 can be any conventional compressor apparatus, such as a piston compressor, turbine, scroll compressor, etc. The compressor 387 shown in FIG. 8B is powered by a shaft 388 which can be driven by an external power source or the engine itself or output from the expander, or some combination thereof.

Figure 9:
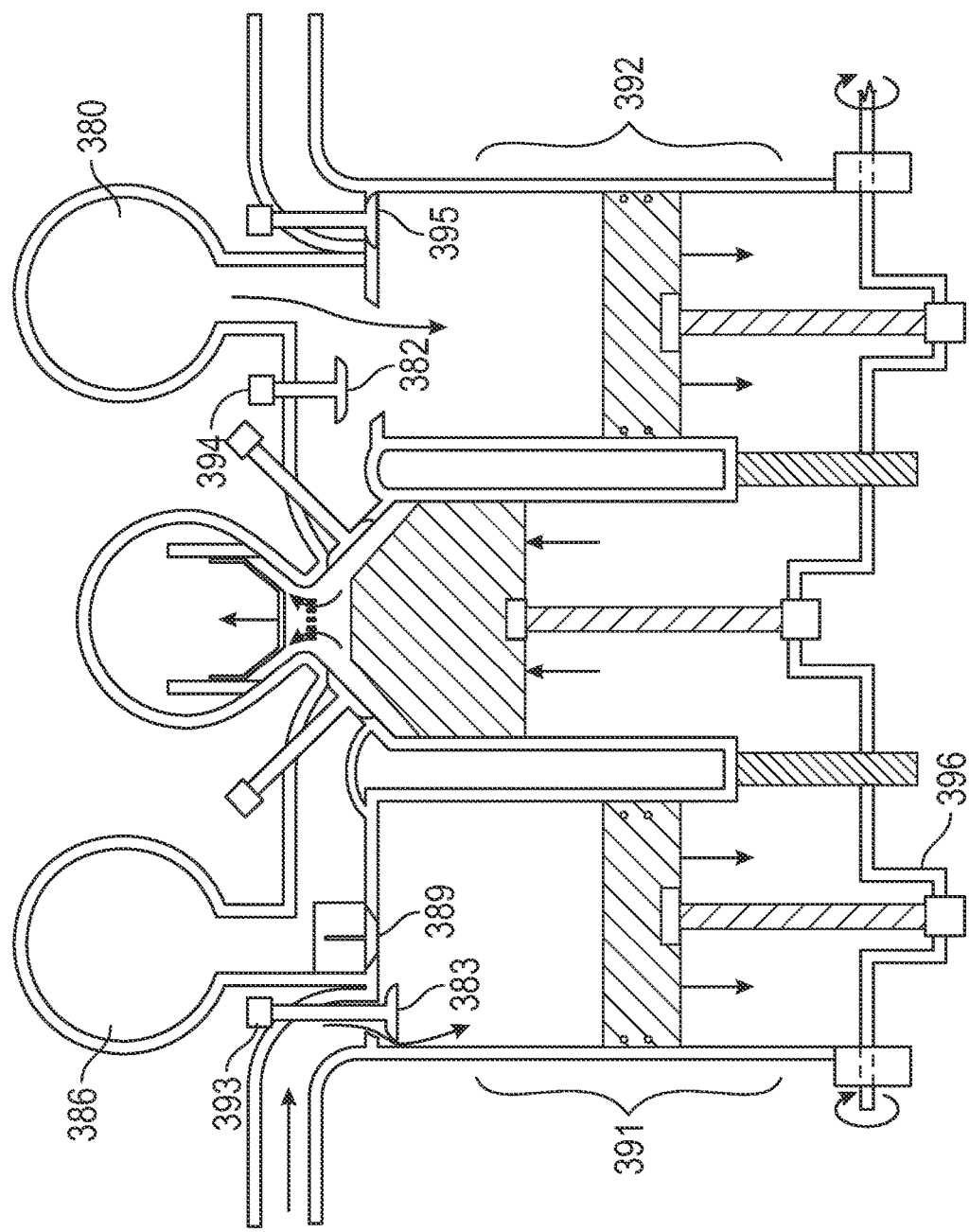
FIG. 9 is a cross-section view in elevation of a mesh anchored combustion engine built in accordance with a second supercharged embodiment of the present invention.

Referring now to FIG. 9, a second supercharged embodiment of the present includes a piston type compressor 391 and a piston type expander 392, are both coupled to a common crankshaft 396 so that the compressor 391 draws the necessary power from this shaft, while the expander 392 adds its power output to the same shaft. Air intake into the compressor 391 is controlled by the intake valve 383 with its own valve actuator 393. Compressed air flows through check-valve 389 when the pressure in the compressor 391 exceeds the pressure in the intake pressure reservoir 386. Likewise, a controlled quantity of pressurized exhaust gas from the exhaust pressure reservoir 380 flows into the expander 392 through valve 382 when it is opened by its valve actuator 394. The expanded exhaust gas exits the expander 392 during its exhaust stroke through exhaust valve 395 which is only open during the exhaust stroke.

Advantageously, this embodiment enables the engine to be balanced, at least to first order, by suitably weighting the various pistons. Also, the use of a common crankshaft in this realization means that wasteful energy conversion steps are avoided.

Figure 10A:
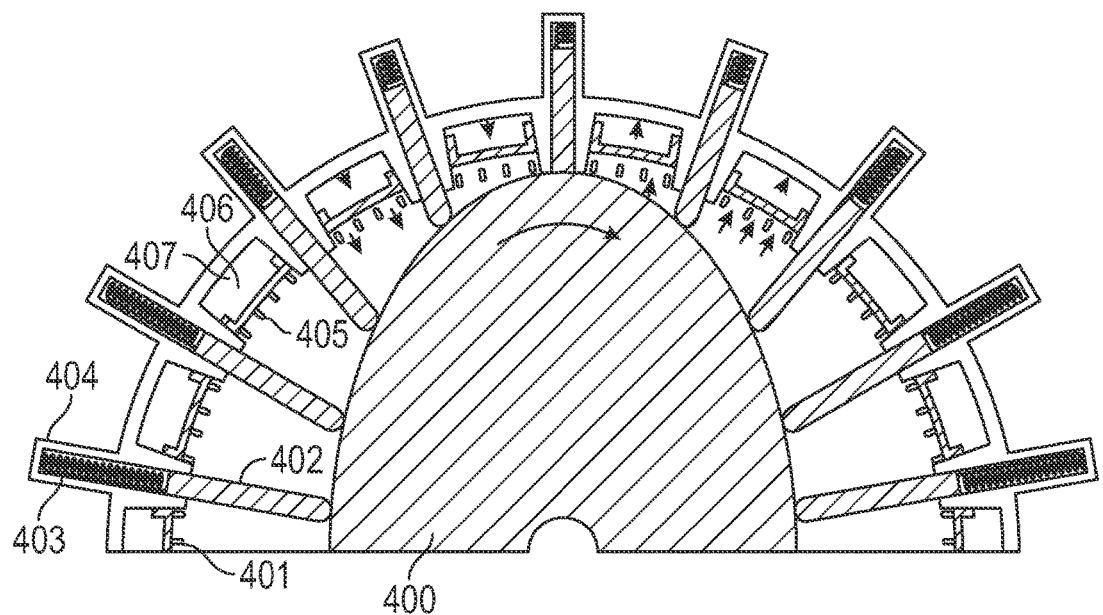
FIG. 10A is a top plan view of a mesh anchored combustion engine built in accordance with a rotary engine embodiment of the present invention.

It is contemplated that the instant invention can be applied to a plurality of engine types. In the embodiments illustrated above, the compression or expansion of the gases is provided by a piston sliding in its cylinder—an arrangement common to nearly all positive displacement ICEs. Alternative engine positive displacement means are also known in the art, particularly a class of engines referred to as rotary engines. This class includes the Wankel engine and various forms of sliding-vane engines. Referring now to FIG. 10A, the top half (the bottom half is identical) of a sliding-vanes engine is shown as a rotor 400 rotating clockwise with a set of sliding vanes 402 whose tips are in sliding contact with the rotor 400 thus providing a gas seal between adjacent cells. The sliding vanes 402 slide within enclosing slots 404 and a spring 403 inside this slot 404 to provide the contact pressure that keeps the vane 402 in contact with the rotor 400. A cell is bounded by a pair of adjacent vanes 402, the rotor 400, the housing 401, and the side walls (not shown). Gas enters and leaves each cell through port valves on the side (not shown) as these ports are exposed or covered up by the rotating rotor 400. As the rotor 400 rotates, the volume of each cell cyclically varies from practically zero to a maximum when adjacent vanes 402 are maximally extended. This changing volume is analogous to that provided by a piston in its cylinder, and thereby enabling the mesh combustion detailed above for piston engines to be readily adapted to rotary engines.

Figure 10B:
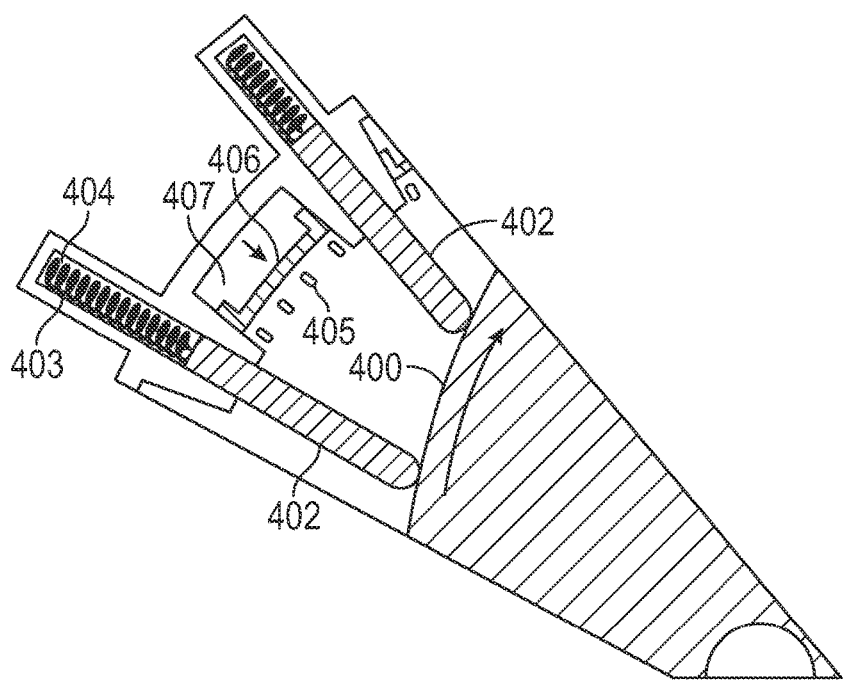
FIG. 10B is a partial plan view of a mesh anchored combustion engine built in accordance with a rotary engine embodiment of the present invention

Referring now to FIGS. 10A and 10B, when one of the cells is in the process of expanding, the unburned charge previously compressed between the auxiliary piston 406 and the rotor 400 is now re-entering the cell volume through mesh 405. This unburned charge burns as it exits the mesh 405 as previously described. The auxiliary piston 406 slides within sealed chamber 407 which contains compressed air maintained at the desired maximum operating pressure. This compressed air keeps the auxiliary piston 406 seated during those parts of the cycle when the cell pressure is below the maximum operating in the chamber 407, while style allowing the auxiliary piston 406 to move away from the mesh 405 when the pressure in the cell volume exceeds the maximum operating pressure. In short, mesh combustion for rotary engines is essentially the same as that for piston engines, with the rotor (Wankel engine) or rotor+sliding vanes (FIG. 10A) replacing the piston as the positive-displacement compression/expansion means. Another difference is that because the (port) valves for rotary engines are off to the side, the auxiliary piston 406 and chamber does not have to share the head area with the valves, so auxiliary piston 406 area can be much larger.

The present invention has been shown and described herein in what is considered to be the most practical and preferred embodiment. It is recognized, however, that departures may be made therefrom within the scope of the invention and that obvious modifications will occur to a person skilled in the art.

What is claimed is:

1. An engine with mesh anchored combustion, comprising:
   a main cylinder having a main chamber with a main piston slidably disposed therein, wherein said main piston is configured to complete at least an expansion stroke and a compression stroke in the main cylinder;
   an auxiliary cylinder having a free-floating auxiliary piston slidably disposed therein and an auxiliary chamber, wherein said auxiliary chamber is connected to the main chamber through a throat channel; and
   a mesh disposed in the throat channel, wherein the mesh is positioned such that any fluid material gases passing between the auxiliary chamber and the main chamber must traverse through the mesh and configures the engine such that combustion is anchored to said mesh; and
   wherein the auxiliary piston and main piston cooperate to move the fuel-air mixture through the mesh.

2. The engine of claim 1, additionally comprising at least one igniter positioned adjacent to said mesh, wherein said at least one igniter is configured to selectively initiate a flame on the main chamber side of the mesh.

3. The engine of claim 1, wherein said auxiliary piston is configured to block the flow of relatively uncompressed fluid material gases from the main chamber to the auxiliary chamber through the mesh.

4. The engine of claim 1, wherein said auxiliary piston is configured to allow pressurized fluid material gases in the main chamber to enter the auxiliary chamber through the mesh during the compression stroke of the main piston.

5. The engine of claim 1, wherein at least one of said auxiliary piston and main piston are configured to move fluid material gases in the auxiliary chamber through the mesh into the main chamber during the expansion stroke of the main piston.

6. The engine of claim 1, wherein the mesh is configured with at least one igniter such that such when a fuel-air mixture in the auxiliary chamber is moved through the mesh, the fuel-air mixture is ignited as it exits the mesh.

7. The engine of claim 1, wherein the auxiliary piston is adapted to move between a seated position where the flow of fluid material gases through the mesh is blocked and an unseated position where the flow of fluid material gases through the mesh is unblocked.

8. The engine of claim 7, wherein the auxiliary piston defines a free piston movable between the seated position and unseated position driven by compressed gas in the auxiliary cylinder.

9. The engine of claim 8, additionally comprising a pressure chamber connected to the head of the main cylinder and adapted to maintain a reference pressure, wherein the auxiliary cylinder is integral with the pressure chamber so as to cause the auxiliary piston to remain in its seated position unless fluid material gases in the main chamber is compressed to a pressure equal or higher than the reference pressure.

10. The engine of claim 1, wherein the throat channel is relatively narrow relative to the main chamber and auxiliary chamber.

11. The engine of claim 1, wherein the auxiliary cylinder is constructed in a funnel design and is substantially wider than the width of the throat channel.

12. An engine with mesh anchored combustion, comprising:
    a main cylinder having a main chamber with a main piston slidably disposed therein, wherein said main piston is configured to complete at least an expansion stroke and a compression stroke in the main cylinder;
    an auxiliary cylinder having a free-floating auxiliary piston slidably disposed therein and an auxiliary chamber, wherein said auxiliary chamber is connected to the main chamber through a throat channel and the auxiliary piston defines a piston adapted to be moved between a seated position where the flow of fluid material gases through the mesh is blocked and an unseated position where the flow of fluid material gases through the mesh is unblocked;
    a mesh disposed in the throat channel, wherein the mesh is positioned such that any fluid material gases passing between the auxiliary chamber and the main chamber must traverse through the mesh and configures the engine such that combustion is anchored to said mesh; and wherein the auxiliary piston and main piston cooperate to move the fuel-air mixture through the mesh and at least one igniter positioned adjacent to said mesh, wherein said at least one igniter is configured to selectively initiate a flame on the main chamber side of the mesh.

13. The engine of claim 12, wherein the mesh is defined by a plurality of interlaced walls which are relatively narrow on the auxiliary chamber side and wide on the main chamber side, thereby configuring the mesh to minimize the flow resistance of fluid gases flowing through it from the main chamber to the auxiliary chamber.

14. The engine of claim 12, wherein the mesh is configured to minimize heat loss to the main cylinder head.

15. The engine of claim 12, wherein the auxiliary piston defines a free piston movable between the seated position and unseated position driven by compressed gas in the auxiliary cylinder.

16. The engine of claim 15, additionally comprising a pressure chamber connected to the head of the main cylinder and adapted to maintain a reference pressure, wherein the auxiliary cylinder is integral with the pressure chamber so as to cause the auxiliary piston to remain in its seated position unless fluid material gases in the main chamber is compressed to a pressure equal or higher than the reference pressure.

17. The engine of claim 12, wherein the throat channel is relatively narrow relative to the main chamber and auxiliary chamber.

18. The engine of claim 12, wherein the auxiliary cylinder is constructed in a funnel design and is substantially wider than the width of the throat channel.

19. An engine with mesh anchored combustion, comprising:
a main cylinder having a main chamber with a main piston slidably disposed therein, wherein said main piston is configured to complete at least an expansion stroke and a compression stroke in the main cylinder;
an auxiliary cylinder having a free-floating auxiliary piston slidably disposed therein and an auxiliary chamber, wherein said auxiliary chamber is connected to the main chamber through a throat channel that is relatively narrow relative to the main chamber and auxiliary chamber;
a mesh disposed in the throat channel, wherein the mesh is positioned such that any fluid material gases passing between the auxiliary chamber and the main chamber must traverse through the mesh and configures the engine such that combustion is anchored to said mesh; and
wherein the auxiliary piston and main piston cooperate to move the fuel-air mixture through the mesh and at least one igniter positioned adjacent to said mesh, wherein said at least one igniter is configured to selectively initiate a flame on the main chamber side of the mesh;
said mesh defined by a plurality of interlaced walls which are relatively narrow on the auxiliary chamber side and wide on the main chamber side, thereby configuring the mesh to minimize the flow resistance of fluid gases flowing through it from the main chamber to the auxiliary chamber; and
said auxiliary piston adapted to move between a seated position where the flow of fluid material gases through the mesh is blocked and an unseated position where the flow of fluid material gases through the mesh is unblocked through compressed gas in the auxiliary cylinder.

20. The engine of claim 19, additionally comprising a pressure chamber connected to the head of the main cylinder and adapted to maintain a reference pressure, wherein the auxiliary cylinder is integral with the pressure chamber so as to cause the auxiliary piston to remain in its seated position unless fluid material gases in the main chamber is compressed to a pressure equal or higher than the reference pressure.

* * * * *